United States Patent
Rosios et al.

(10) Patent No.: US 10,573,480 B2
(45) Date of Patent: Feb. 25, 2020

(54) DISC FUSE

(71) Applicant: Littelfuse, Inc., Chicago, IL (US)

(72) Inventors: Maria Lily E. Rosios, Santiago (PH); Albert Enriquez, Lipa (PH); Todd Dietsch, Park Ridge, IL (US); Werner Johler, Richterswil (CH)

(73) Assignee: LITTELFUSE, INC., Chicago, IL (US)

( * ) Notice: Subject to any disclaimer, the term of this patent is extended or adjusted under 35 U.S.C. 154(b) by 0 days.

(21) Appl. No.: 16/014,334

(22) Filed: Jun. 21, 2018

(65) Prior Publication Data
US 2019/0393011 A1  Dec. 26, 2019

(51) Int. Cl.
| | |
|---|---|
| *H01H 85/20* | (2006.01) |
| *H01H 85/143* | (2006.01) |
| *H01H 85/055* | (2006.01) |
| *H01M 2/34* | (2006.01) |
| *H01H 69/02* | (2006.01) |
| *H02J 7/00* | (2006.01) |

(52) U.S. Cl.
CPC .......... *H01H 85/143* (2013.01); *H01H 69/02* (2013.01); *H01H 85/055* (2013.01); *H01H 85/20* (2013.01); *H01M 2/348* (2013.01); *H01M 2220/30* (2013.01); *H02J 7/0029* (2013.01)

(58) Field of Classification Search
CPC .... H01H 85/143; H01H 69/02; H01H 85/055; H01H 85/20; H01M 2/348; H01M 2220/30; H02J 7/0029
USPC ........................................................ 337/187
See application file for complete search history.

(56) References Cited

U.S. PATENT DOCUMENTS

| | | | | | |
|---|---|---|---|---|---|
| 2,060,464 | A | * | 11/1936 | Goodwin | ............... H01H 85/30 337/265 |
| 4,652,848 | A | * | 3/1987 | Hundrieser | .......... H01H 85/046 337/297 |
| 6,198,376 | B1 | * | 3/2001 | Ishikawa | ............... H01H 37/761 337/159 |
| 6,855,008 | B1 | * | 2/2005 | Freitag | ................ H01H 85/044 439/620.26 |

(Continued)

FOREIGN PATENT DOCUMENTS

| | | |
|---|---|---|
| CN | 106207252 A | 12/2016 |
| EP | 1126534 A1 | 8/2001 |

OTHER PUBLICATIONS

European Search Report for the European Patent Application No. 19181654, dated Oct. 22, 2019, 8 pages.

*Primary Examiner* — Anatoly Vortman

(57) ABSTRACT

A disc fuse including an electrically insulating substrate having a via formed therethrough extending between a first surface and a second surface of the substrate, an electrically conductive first terminal disposed on the first surface of the substrate, and an electrically conductive second terminal disposed on the second surface of the substrate, the second terminal including an outer portion having an inner edge defining a through-hole in the second terminal, the second terminal further including a fuse portion extending from the inner edge, the fuse portion comprising a fusible element terminating in a contact pad, wherein the substrate provides an electrically insulating barrier between the first terminal and the second terminal and wherein the via provides an electrical connection between the first terminal and the contact pad.

10 Claims, 4 Drawing Sheets

(56) References Cited

U.S. PATENT DOCUMENTS

| | | | |
|---|---|---|---|
| 6,902,434 B2* | 6/2005 | Stack | H01H 85/044 |
| | | | 337/187 |
| 6,932,650 B1* | 8/2005 | Freitag | H01R 11/287 |
| | | | 337/188 |
| 7,172,462 B1* | 2/2007 | Gronowicz, Jr. | H01H 85/044 |
| | | | 439/620.26 |
| 7,837,745 B2* | 11/2010 | Barella | H01M 2/34 |
| | | | 29/623.1 |
| 7,924,137 B2* | 4/2011 | Rahman | H01H 85/044 |
| | | | 337/158 |
| 10,090,509 B2* | 10/2018 | Tanaka | H01M 2/34 |
| 2004/0241536 A1 | 12/2004 | Kim | |
| 2009/0027821 A1* | 1/2009 | Colby | H01C 7/02 |
| | | | 361/104 |

* cited by examiner

DISC FUSE

FIELD OF THE DISCLOSURE

The disclosure relates generally to the field of circuit protection devices, and more particularly to a disc fuse suitable for use in battery cells.

BACKGROUND OF THE DISCLOSURE

Many electronic devices are powered by battery packs that include pluralities of individual battery cells (e.g., cylindrical lithium-ion secondary batteries) that are connected to one another in a parallel or series arrangement to achieve a desired voltage output. If excessive current is allowed to flow between a battery pack and an electronic device during charging or discharging of the battery pack, the electronic device and/or the battery pack may be damaged. Thus, various devices are used for providing overcurrent protection in battery packs. These include various positive temperature coefficient (PTC) devices and fuse devices adapted to mitigate current in the event of a fault condition. However, such devices are associated with numerous shortcomings, including low hold currents, inability to permanently disable faulty battery cells, and space requirements that increase the overall size of a battery pack.

In view of the foregoing, it is desirable to provide a mechanism for rapidly arresting current flowing between a battery pack and an electronic device upon the occurrence of an overcurrent condition (e.g., an internal short within a cell of the battery pack) while also facilitating high hold currents during normal operation. It is further desirable to provide such a mechanism that can be implemented in individual cells of a battery pack to facilitate robust and expeditious response to overcurrent conditions in a manner that permanently disables faulty battery cells. It is further desirable to implement such a mechanism in a manner that does not increase the size of a battery pack.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of a disc fuse in accordance with the present disclosure may include an electrically insulating substrate having a via formed therethrough extending between a first surface and a second surface of the substrate, an electrically conductive first terminal disposed on the first surface of the substrate, and an electrically conductive second terminal disposed on the second surface of the substrate, the second terminal including an outer portion having an inner edge defining a through-hole in the second terminal, the second terminal further including a fuse portion extending from the inner edge, the fuse portion comprising a fusible element terminating in a contact pad, wherein the substrate provides an electrically insulating barrier between the first terminal and the second terminal and wherein the via provides an electrical connection between the first terminal and the contact pad.

Another exemplary embodiment of a disc fuse in accordance with the present disclosure may include an annular, electrically insulating substrate having a via formed therethrough extending between a first surface and a second surface of the substrate, an annular, electrically conductive first terminal disposed on the first surface of the substrate, the first terminal coaxial with the substrate and having a diameter small than a diameter of the substrate, an electrically conductive second terminal disposed on the second surface of the substrate, the second terminal coaxial with the substrate and having a diameter small than the diameter of the substrate, the second terminal including an annular outer portion having an inner edge defining a through-hole in the second terminal, the second terminal further including first and second fuse portions extending from the inner edge, each of the first and second fuse portions being coplanar with the outer portion and comprising a fusible element terminating in a contact pad, and an annular, electrically insulating conformal coating disposed on the second terminal and covering the fusible elements of the first and second fuse portions, wherein the substrate provides an electrically insulating barrier between the first terminal and the second terminal and wherein the via provides an electrical connection between the first terminal and the contact pad.

An exemplary embodiment of a method in accordance with the present disclosure may include providing an electrically insulating substrate having a via formed therethrough extending between a first surface and a second surface of the substrate, disposing an electrically conductive first terminal on the first surface of the substrate, and disposing an electrically conductive second terminal on the second surface of the substrate, the second terminal including an outer portion having an inner edge defining a through-hole in the second terminal, the second terminal further including a fuse portion extending from the inner edge, the fuse portion comprising a fusible element terminating in a contact pad, wherein the substrate provides an electrically insulating barrier between the first terminal and the second terminal and wherein the via provides an electrical connection between the first terminal and the contact pad.

DETAILED DESCRIPTION

Figure 1A:
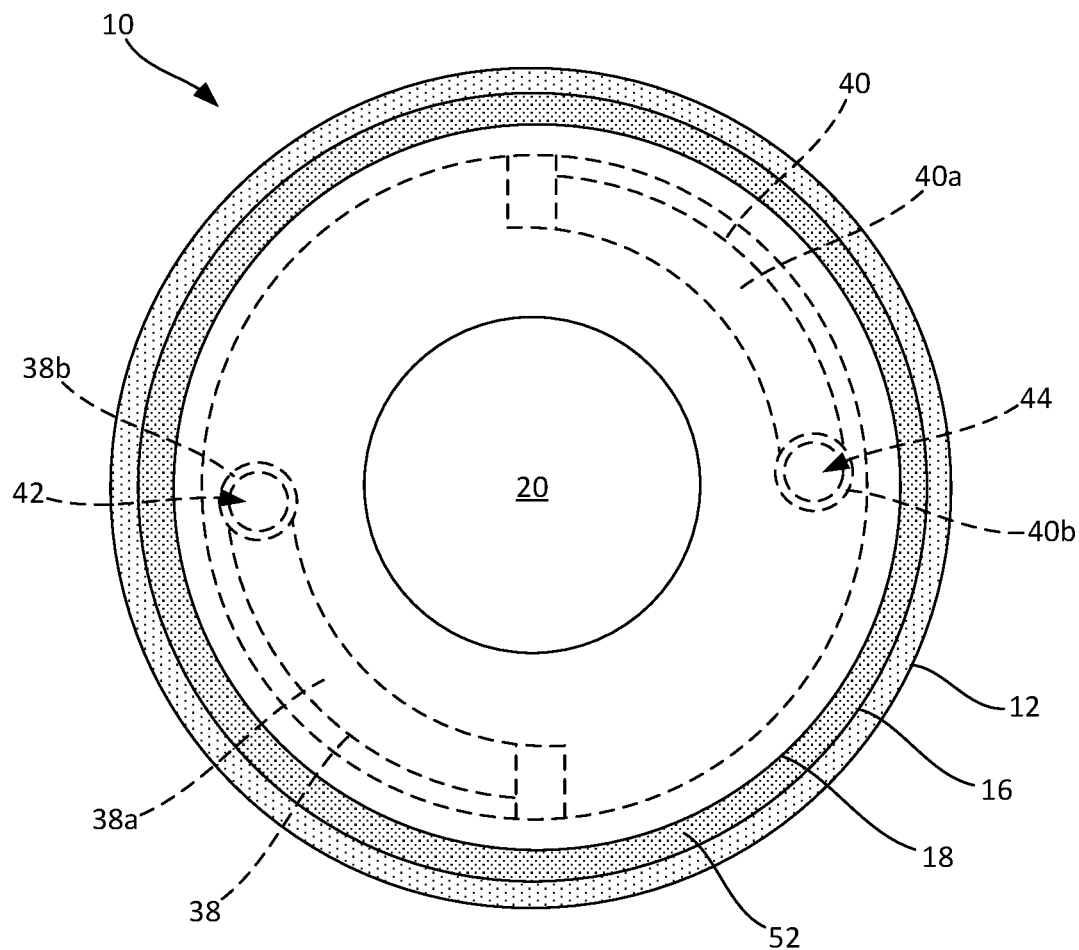
FIG. 1A is a top view illustrating a disc fuse in accordance with an exemplary embodiment of the present disclosure.

Embodiments of a disc fuse and methods for manufacturing the same in accordance with the present disclosure will be described more fully hereinafter with reference to the accompanying drawings, in which preferred embodiments of the disc fuse and the accompanying method are presented. The disc fuse and the accompanying method of the present disclosure may, however, be embodied in many different forms and should not be construed as being limited to the specific embodiments set forth herein. Rather, these embodiments are provided so that this disclosure will convey certain exemplary aspects of the disc fuse and the accompanying method to those skilled in the art. In the drawings, like numbers refer to like elements throughout unless otherwise noted.

Figure 1B:
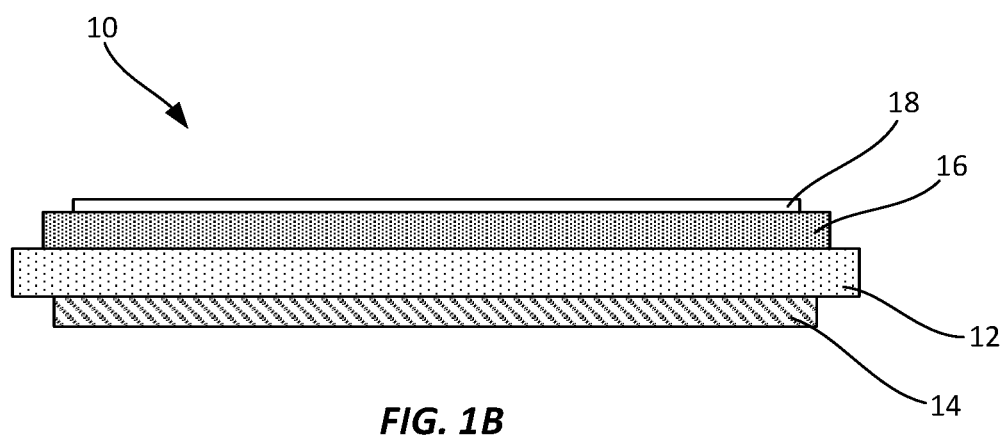
FIG. 1B is a side view illustrating the disc fuse shown in FIG. 1A.
Figure 1C:
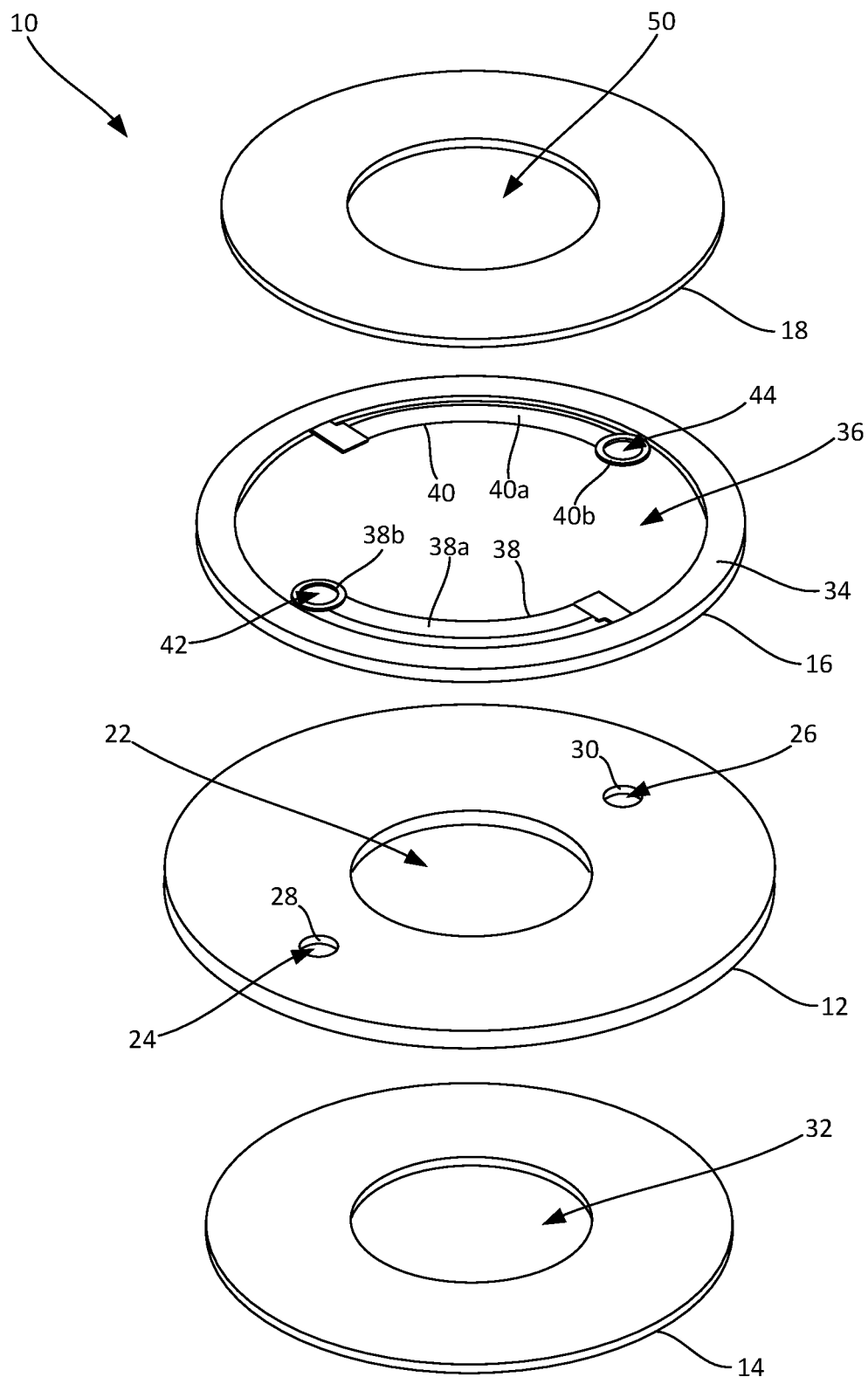
FIG. 1C is an exploded view illustrating the disc fuse shown in FIG. 1A.

Referring to FIGS. 1A-C, a top view, a side view, and an exploded view of a disc fuse 10 in accordance with an exemplary embodiment of the present disclosure is shown. For the sake of convenience and clarity, terms such as "top," "bottom," "upper," "lower," "above," "below," "vertical," "radial," "outer," and "inner" may be used herein to describe the relative positions and orientations of the disc fuse 10 and various elements thereof, all with respect to the geometry and orientation of the disc fuse 10 as it appears in FIGS. 1A-C. Said terminology will include the words specifically mentioned, derivatives thereof, and words of similar import.

The exemplary disc fuse 10 illustrated in FIGS. 1A-C may include several layers of electrically-conductive and electrically-insulating material disposed in a vertically stacked arrangement and configured to provide one or more over-current-protected electrical pathways extending through the disc fuse 10. For example, the disc fuse 10 may include an electrically insulating substrate 12, an electrically conductive first or lower terminal 14 disposed on a first or bottom surface of the substrate 12, an electrically conductive second or upper terminal 16 disposed on a second or top surface of the substrate 12, and an electrically insulating, protective conformal coating 18 disposed on a top surface of the upper terminal 16. Each of the layers of the disc fuse 10 is illustrated as having an annular shape with a central through-hole formed therein to provide the assembled disc fuse 10 with a central through-hole 20 for allowing battery gases to be vented therethrough. This is not intended to be limiting, and it is contemplated that the various layers of the disc fuse 10 may have a variety of alternative shapes without departing from the scope of the present disclosure. For example, various embodiments of the disc fuse 10 are contemplated in which one or more of the layers of the disc fuse 10 may be rectangular, oval, or irregular in shape, and/or may not have a central through-hole formed therein.

The substrate 12, which may have an annular shape defining a through-hole 22 (as described above), may be formed of an electrically insulating material. In a particular embodiment, the substrate 12 may be formed of a glass-reinforced epoxy laminate material such as FR-4. This is not intended to be limiting, and it is contemplated that the substrate 12 may alternatively be formed of various other electrically-insulating materials, including, but not limited to, various plastics and composites. In a non-limiting embodiment, the substrate 12 may have a diameter $D_s$ in a range between 13.8 millimeters and 14.8 millimeters.

The substrate 12 may have vias 24, 26 formed therethrough, with each via 24, 26 extending from the top surface of the substrate 12 to the bottom surface of the substrate 12. As will be described in greater detail below, sidewalls 28, 30 of the vias 24, 26 may be plated or coated with an electrically-conductive material (e.g., tin, copper, nickel, etc.) using an electrolytic plating process, for example. Alternatively, the vias 24, 26 may be completely or partially filled with an electrically-conductive material. The vias 24, 26 may thus provide electrically-conductive pathways extending vertically through the substrate 12. The substrate 12 is illustrated as having two circular vias 24, 26, with each of the vias 24, 26 located radially intermediate the through-hole 22 and the periphery of the substrate 12. This is not intended to be limiting, and in various alternative embodiments of the disc fuse 10 the number, shapes, and locations of the vias 24, 26 may be may be varied. For example, in some embodiments, the substrate 12 may alternatively include only one via or more than two vias. In some embodiments, one or more of the vias may be rectangular, triangular, or irregular in shape.

The lower terminal 14 of the disc fuse 10 may be formed of an electrically-conductive material and may have an annular shape defining a through-hole 32 (as described above). The through-hole 32 may be substantially aligned with (e.g., coaxial with) the through-hole 22 in the substrate 12. The lower terminal 14 may be disposed in contact with, and in some embodiments, may be coupled to, the lower termini of the vias 24, 26 in electrical communication therewith.

In a particular embodiment, the lower terminal 14 may be formed of copper that is laminate cladded onto the bottom surface of the substrate 12. This is not intended to be limiting, and it is contemplated that the lower terminal 14 may be formed of various other conductive materials, including, but not limited to, nickel, silver, gold, etc. In various embodiments, the lower terminal 14 may be deposited on the bottom surface of substrate 12 using various processes, including, but not limited to, one or more of printing, electrolytic deposition, and photolithography. Certain features of the lower terminal 14 may be defined using various etching processes. In various other embodiments, the lower terminal 14 may be an independent structure that is formed entirely separately from the substrate 12 and subsequently disposed in flat abutment with, and optionally affixed to, the bottom surface of the substrate 12. In a non-limiting embodiment, the lower terminal 14 may have a diameter $D_{lt}$ in a range between 13.4 millimeters and 14.4 millimeters, where $D_{lt}$ is less than the diameter $D_s$ of the substrate.

The upper terminal 16 of the disc fuse 10 may be formed of an electrically-conductive material and may include an outer portion 34 having an annular shape defining a through-hole 36 (as described above). The through-hole 36 may be substantially aligned with (e.g., coaxial with) the through-hole 22 in the electrically insulating substrate 12. The upper terminal 16 may further include fuse portions 38, 40 extending from an inner edge of the outer portion 34. The fuse portions 38, 40 may be substantially coplanar with the outer portion 34 and may each include a fusible element 38a, 40a that terminates in a respective contact pad 38b, 40b. The fusible elements 38a, 40a are each shown as having a curvilinear shape that extends along, and is spaced radially apart from, the inner edge of the outer portion 34. This is not intended to be limiting, and it is contemplated that one or both of the fusible elements 38a, 40a may have a variety of different shapes, configurations, and/or orientations relative to those shown. While the upper terminal 16 is shown as having two fuse portions 38, 40, alternative embodiments of the disc fuse 10 are contemplated in which the upper terminal 16 includes only one or more than two fuse portions.

The contact pads 38b, 40b of the fuse portions 38, 40 may be disposed in contact with, and in some embodiments, may be coupled to, the upper termini of the vias 24, 26, respectively, in electrical communication therewith. In a non-limiting example, the contact pads 38b, 40b, which are shown as having an annular shape, may include respective through-holes 42, 44 that may be filled or plated with the same electrically conductive material that fills or plates the vias 24, 26 as described above. In other embodiments, the contact pads 38b, 40b may be entirely solid (i.e., without the through-holes 42, 44 extending therethrough) and may be disposed in contact with, and optionally connected to, the conductive material that fills or plates the vias 24, 26 (described above).

In a particular embodiment, the upper terminal 16 may be formed of copper that is laminate cladded onto the top surface of the substrate 12. This is not intended to be limiting, and it is contemplated that the upper terminal 16 may be formed of various other conductive materials, including, but not limited to, nickel, silver, gold, etc. In various embodiments, the upper terminal 16 may be deposited on the substrate 12 using various processes, including, but not limited to, one or more of printing, electrolytic deposition, and photolithography. In various embodiments, certain features of the upper terminal 16, including the fuse portions 38, 40, may be defined using various etching processes. In various other embodiments, the upper terminal 16 may be an independent structure that is formed entirely separately from the substrate 12 and subsequently disposed in flat abutment with, and optionally affixed to, the upper surface of the substrate 12. In a non-limiting embodiment, the upper terminal 16 may have a diameter $D_{ut}$ in a range between 13.4 millimeters and 14.4 millimeters, where $D_{ut}$ is less than the diameter $D_s$ of the substrate.

Figure 2:
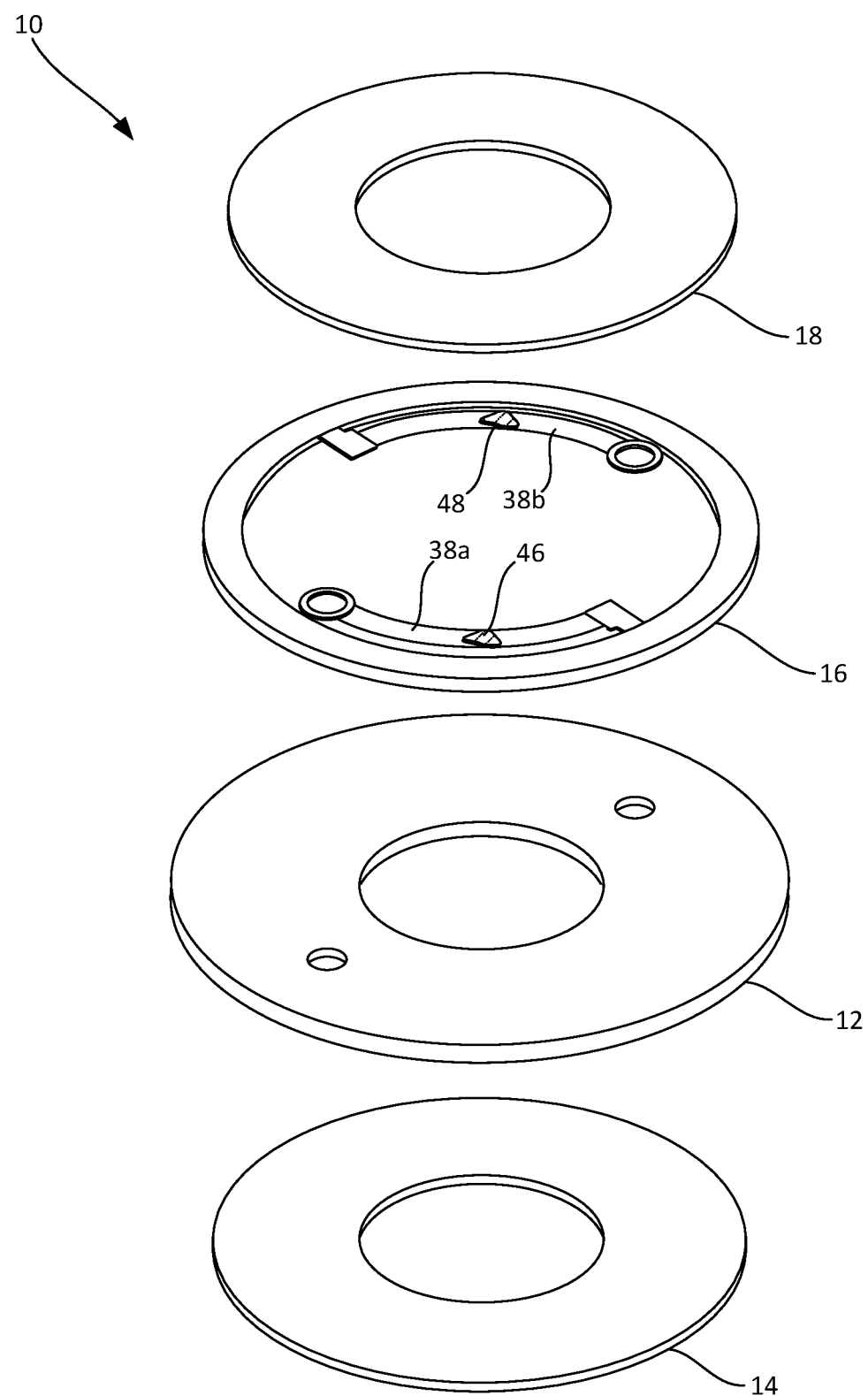
FIG. 2 is an exploded view illustrating an alternative embodiment of the disc fuse shown in FIG. 1A.

The fusible elements 38a, 40a of the fuse portions 38, 40 may be configured to melt or otherwise separate when an amount of current flowing through the fusible elements 38a, 40a exceeds a predetermined value. This predetermined value may be referred to as the "rating" or "capacity" of the disc fuse 10. The rating of the disc fuse 10 may depend on various factors, including, but not limited to, the dimensions of the fusible elements 38a, 40a and the material(s) from which the fusible elements 38a, 40a are formed. For example, a lower rating may be achieved by making the fusible elements 38a, 40a thinner and/or narrower. Additionally, referring to the alternative embodiment of the disc fuse 10 shown in FIG. 2, one or more dissimilar metal spots 46, 48, sometimes referred to as a "Metcalf spots," can be applied to one or both of the fusible elements 38a, 40a at areas where it may be desirable for the fusible elements 38a, 40a to separate in the event of a fault condition (e.g., at the longitudinal centers of the fusible elements 38a, 40a). The dissimilar metal spots 46, 48 may be formed of one or more of nickel, indium, silver, and tin, for example. The dissimilar metal spots 46, 48 may have a lower melting temperature than that of the base metal of fusible elements 38a, 40a (e.g., copper). The dissimilar metal spots 46, 48 may therefore melt more quickly than the fusible elements 38a, 40a and may diffuse into the base metal of the fusible elements 38a, 40a. The base metal and the dissimilar metals are chosen such that the diffusion of one into the other results in an intermetallic phase with a lower melting temperature and higher resistance than those of the base metal, which causes the fusible elements 38a, 40a to melt at lower overcurrent levels than would occur in the absence of the dissimilar metal spots 46, 48.

Referring again to FIGS. 1A-1C, the conformal coating 18 of the disc fuse 10 may be formed of an electrically-insulating material and may have an annular shape defining a through-hole 50 (as described above). The conformal coating 18 may cover the fusible elements 38a, 40a and may shield the fusible elements 38a, 40a from particulate matter and other contaminates that could otherwise damage or affect the operational characteristics of the fusible elements 38a, 40a. In various non-limiting embodiments, the conformal coating 18 may be an electrically insulating epoxy that is printed, sprayed or otherwise applied to the top surfaces of the upper terminal 16 and the substrate 12. In other embodiments, the conformal coating 18 may be an independent, self-supporting member (e.g., a separate disc formed of electrically insulating material) that is affixed to the upper terminal 16 and/or the substrate 12.

The conformal coating 18 may be coaxial with the upper terminal 16 and may have a diameter $D_{cc}$ in a range between 11.2 millimeters and 11.5 millimeters, where $D_{cc}$ is smaller than the diameter $D_{ut}$ of the upper terminal such that an annular, radially-outermost contact portion 52 (FIG. 1A) of the outer portion 34 is exposed for facilitating electrical connection of the upper terminal 16 to another circuit component (e.g., a top cap of a cylindrical battery cell). This is not intended to be limiting, and it is contemplated that in various other embodiments the conformal coating 18 may cover substantially the entirety of the upper terminal 16 expect for one or more discrete areas where the conformal coating 18 may be cut, etched, or otherwise removed to expose an underlying surface of the outer portion 34. Further embodiments of disc fuse 10 are also contemplated in which a lower surface of the lower terminal 14 is provided with a conformal coating similar to the conformal coating 18.

In a typical implementation, the disc fuse 10 may be installed in a cylindrical battery cell (not shown) with the exposed portion 52 of the upper terminal 16 electrically connected to a top cap of the cylindrical battery cell and with the lower terminal 14 electrically connected to a bottom cap of the cylindrical battery cell. During normal operation, current may flow from the bottom cap to the lower terminal 14, through the vias 24, 26, to the contact pads 38b, 40b, through the fusible elements 38a, 40a, to the outer portion 34, and finally to the upper terminal 16. Current my also flow through these elements in reverse order (e.g., if the battery cell is being charged). In the event of an overcurrent condition, the amount current flowing through the fusible elements 38a, 40a may exceed the rating or capacity of the disc fuse 10, in which case the fusible elements 38a, 40a may separate. Current flowing through the disc fuse 10 and between the bottom cap and the top cap of the battery cell is thereby permanently arrested, thus preventing or mitigating damage to connected electrical elements and/or devices.

Figure 3:
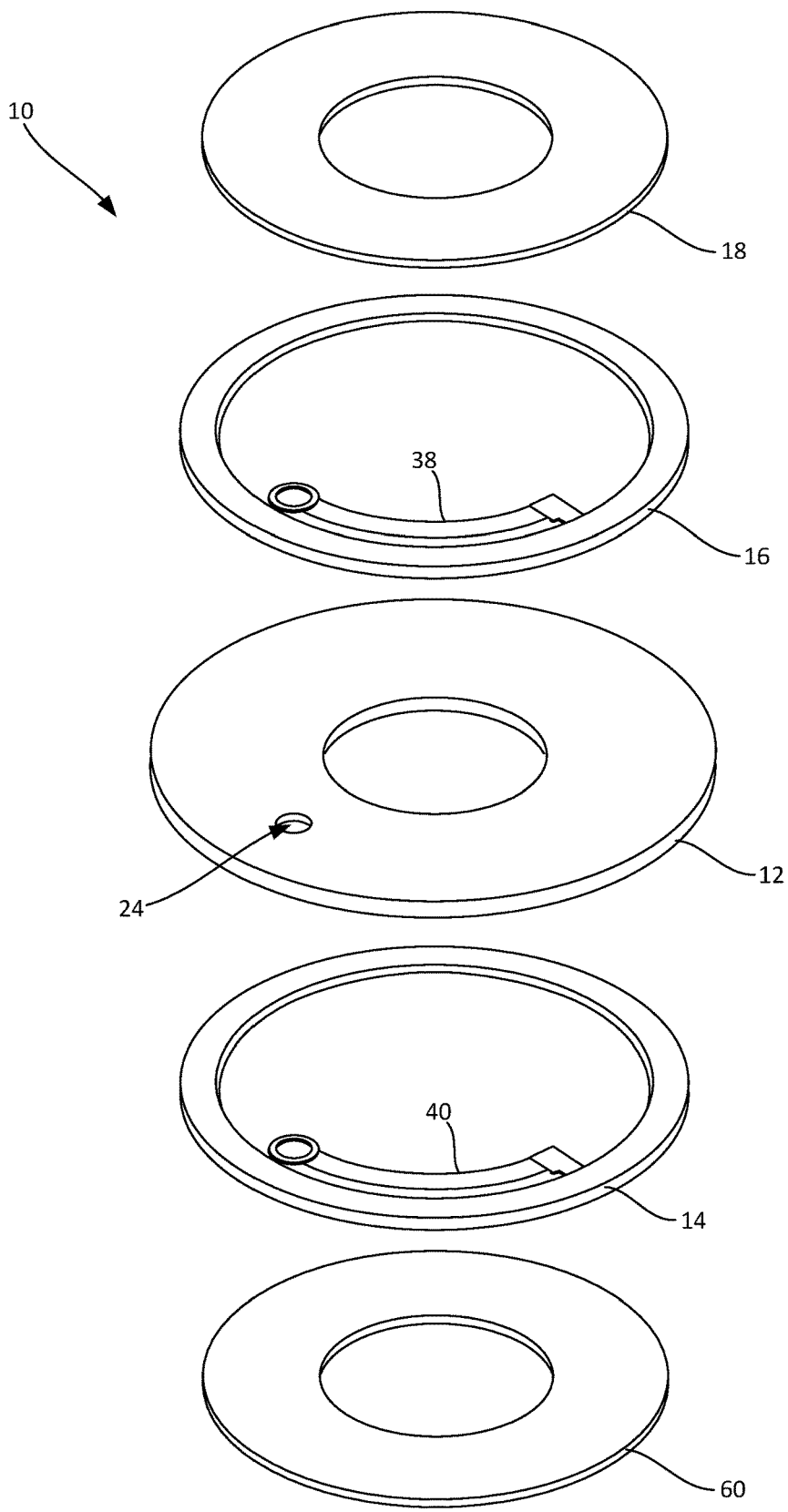
FIG. 3 is an exploded view illustrating another alternative embodiment of the disc fuse shown in FIG. 1A.

The fuse portions 38, 40 of the disc fuse 10 shown in FIGS. 1A-1C are disposed in an electrically parallel arrangement. This is not intended to be limiting, and various alternative embodiments of the disc fuse 10 are contemplated in which the fuse portions may be arranged electrically in series with one another. For example, referring to FIG. 3, an exemplary alternative embodiment of the disc fuse 10 is shown in which the lower terminal 14 and the upper terminal 16 each include a single fuse portion 38, 40 that are connected electrically in series with one another by the via 24 in the substrate 12. It will be noted that the lower terminal 14 in this exemplary embodiment of the disc fuse 10 may be provided with a conformal coating 60 disposed on a bottom surface thereof, wherein the conformal coating 60 may be substantially similar to the conformal coating 18 described above.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A disc fuse comprising:
an electrically insulating substrate having a via formed therethrough extending between a first surface and a second surface of the electrically insulating substrate;
an electrically conductive first terminal disposed on the first surface of the electrically insulating substrate; and
an electrically conductive second terminal disposed on the second surface of the electrically insulating substrate, the second terminal including an outer portion having an inner edge defining a through-hole in the second terminal, the second terminal further including a fuse portion extending from the inner edge, the fuse portion comprising a fusible element terminating in a contact pad;
wherein the electrically insulating substrate provides an electrically insulating barrier between the first terminal and the second terminal and wherein the via provides an electrical connection between the first terminal and the contact pad wherein the second terminal is annular and wherein the fusible element has a curvilinear shape that extends along, and is spaced radially apart from, the inner edge of the outer portion.

2. The disc fuse of claim 1, further comprising an electrically insulating conformal coating disposed on the second terminal and covering the fusible element.

3. The disc fuse of claim 1, wherein the fuse portion is coplanar with the outer portion.

4. The disc fuse of claim 1, wherein the electrically insulating substrate, the first terminal, and the second terminal are annular.

5. The disc fuse of claim 4, wherein the electrically insulating substrate, the first terminal, and the second terminal are coaxial, and wherein the first terminal and the second terminal have diameters that are smaller than a diameter of the electrically insulating substrate.

6. The disc fuse of claim 1, wherein the contact pad is annular, and wherein the via and the contact pad are at least partially filled with an electrically conductive material.

7. The disc fuse of claim 1, wherein the fusible element is formed of a first metal, the disc fuse further comprising a spot formed of a second metal disposed on the fusible element, the second metal having a lower melting temperature than the first metal.

8. The disc fuse of claim 1, wherein the fuse portion is a first fuse portion, the disc fuse further comprising a second fuse portion extending from the inner edge of the outer portion.

9. The disc fuse of claim 1, wherein the fuse portion is a first fuse portion and wherein the first terminal includes an outer portion having an inner edge defining a through-hole in the first terminal, the disc fuse further comprising a second fuse portion extending from the inner edge of the outer portion of the first terminal.

10. A disc fuse comprising:
an annular, electrically insulating substrate having a via formed therethrough extending between a first surface and a second surface of the electrically insulating substrate;
an annular, electrically conductive first terminal disposed on the first surface of the electrically insulating substrate, the first terminal coaxial with the electrically insulating substrate and having a diameter smaller than a diameter of the electrically insulating substrate;
an electrically conductive second terminal disposed on the second surface of the electrically insulating substrate, the second terminal coaxial with the electrically insulating substrate and having a diameter smaller than the diameter of the electrically insulating substrate, the second terminal including an annular outer portion having an inner edge defining a through-hole in the second terminal, the second terminal further including a first and a second fuse portions extending from the inner edge, each of the first and second fuse portions being coplanar with the outer portion and comprising a fusible element terminating in a contact pad; and
an annular, electrically insulating conformal coating disposed on the second terminal and covering the fusible elements of the first and second fuse portions;
wherein the electrically insulating substrate provides an electrically insulating barrier between the first terminal and the second terminal and wherein the via provides an electrical connection between the first terminal and the contact pad.

* * * * *